Figure 1:
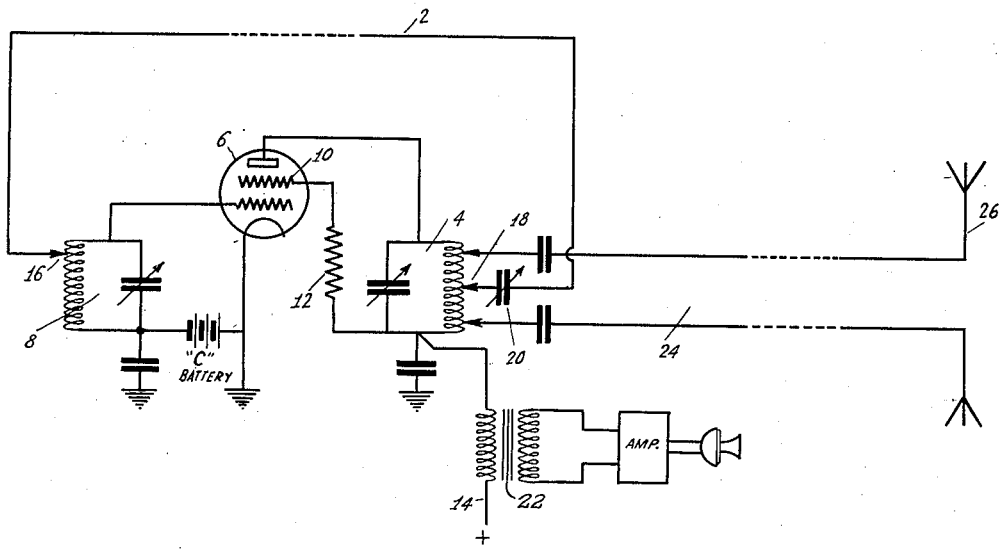

Sept. 17, 1935.  J. W. CONKLIN ET AL  2,014,424
FREQUENCY CONTROL SYSTEM
Filed Jan. 26, 1931   4 Sheets-Sheet 1

INVENTORS
JAMES W. CONKLIN
JAMES L. FINCH
BY
ATTORNEY

Sept. 17, 1935.  J. W. CONKLIN ET AL  2,014,424
FREQUENCY CONTROL SYSTEM
Filed Jan. 26, 1931   4 Sheets-Sheet 2
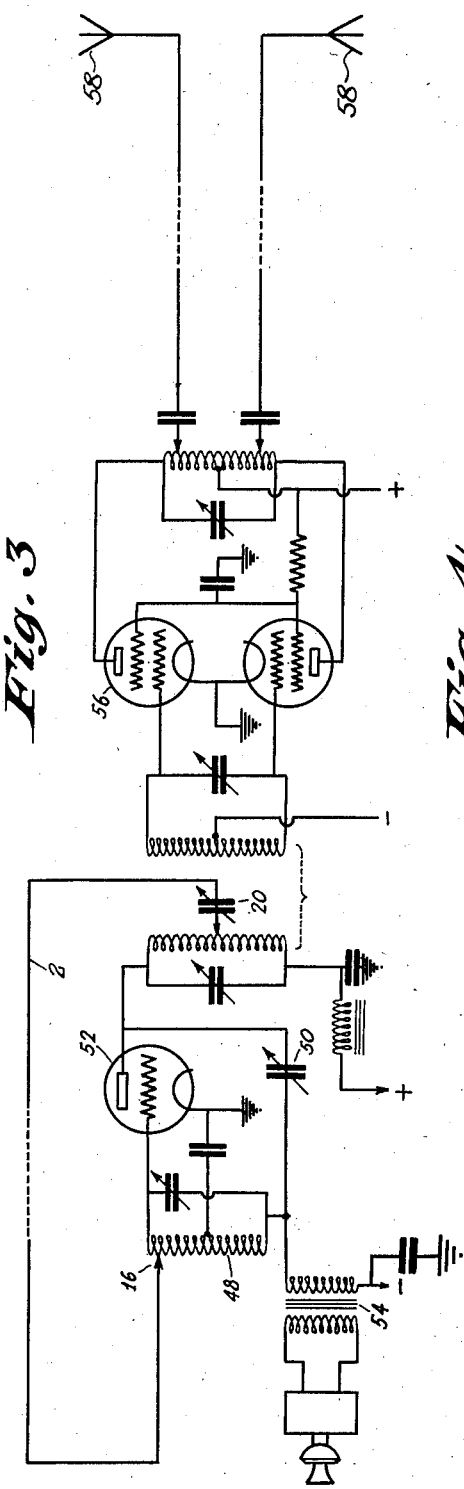
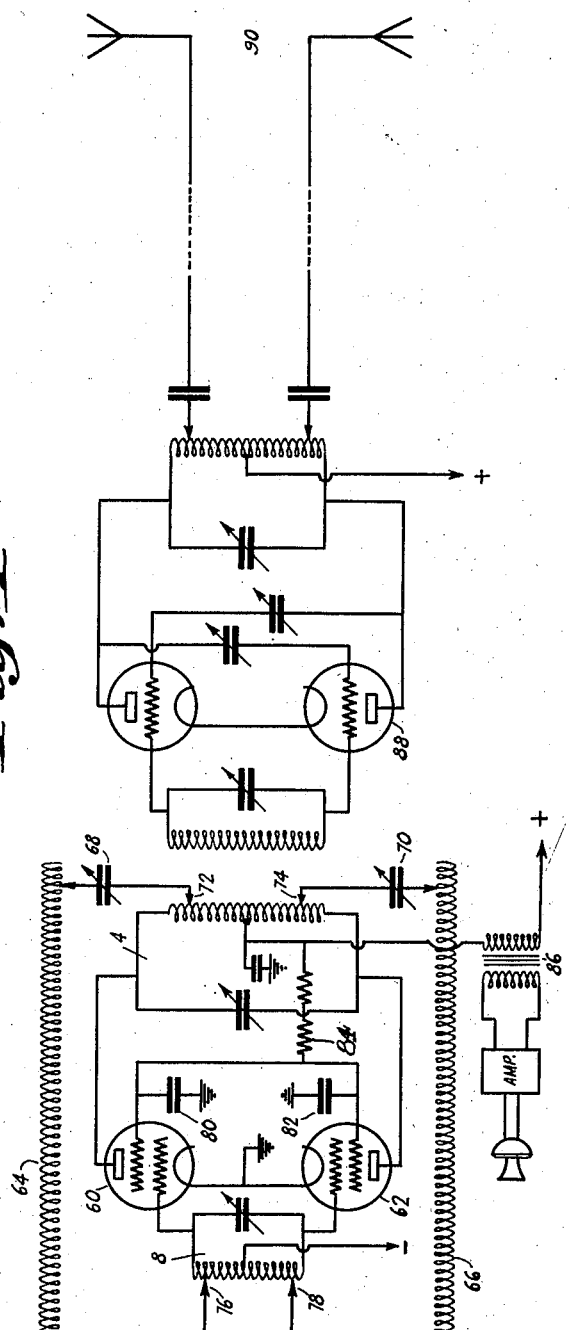
INVENTORS
JAMES W. CONKLIN
JAMES L. FINCH
BY
ATTORNEY

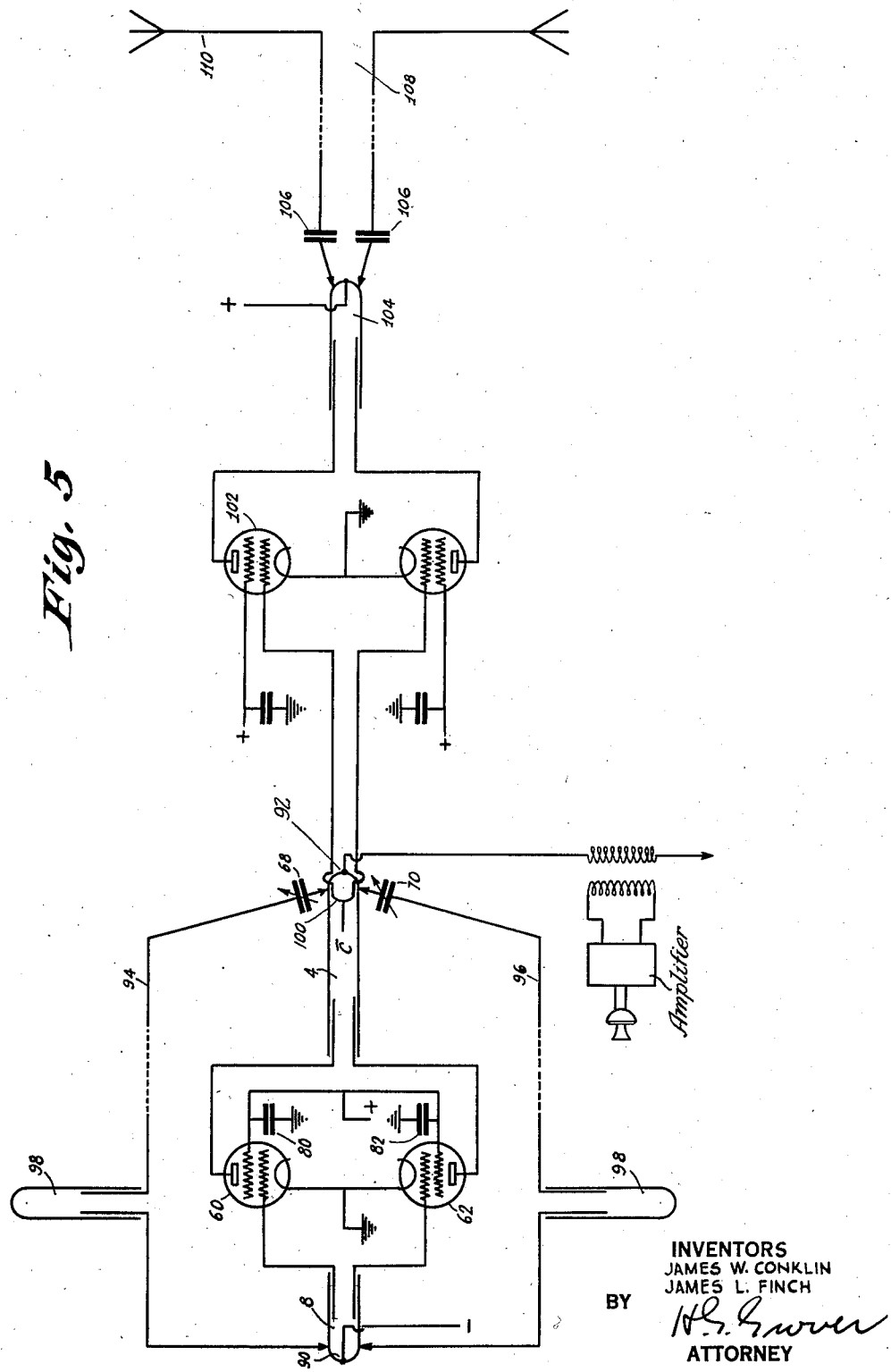

Patented Sept. 17, 1935

2,014,424

UNITED STATES PATENT OFFICE 2,014,424

FREQUENCY CONTROL SYSTEM

James W. Conklin, Rocky Point, and James L. Finch, Patchogue, N. Y., assignors to Radio Corporation of America, a corporation of Delaware Application January 26, 1931, Serial No. 511,210

16 Claims. (Cl. 250—36)

In United States Patent No. 1,945,545, granted February 6, 1934 to James L. Finch and James W. Conklin, there is disclosed a frequency control system wherein a long line, coupling input and output circuits of an electron discharge device accurately controls the frequency at which the device operates. The accurate frequency controlling effect is due, in part, to the fact that the line is made substantially a whole number of half wave lengths long at the working frequency, and to the fact that it is properly terminated by an impedance equivalent to its surge impedance at its output end such that energy transfer over the line is purely aperiodic. In addition, to insure feed back solely over the line, inter-circuit shielding and screen grid tubes or neutralizing elements are provided whereby the effects of inter-circuit coupling and interelectrode feed back; namely, parasitic oscillations, are avoided.

As a consequence of the structure described, all feed back occurs over the line; and, by a proper choice of the number of half wave lengths for the length of the line, the control electrode and anode of the device will oscillate in potential substantially 180 degrees out of phase at only the wave length for which the line is made, in length, a correct number of whole half wave lengths. The 180 degree phase opposition of anode and grid potentials is, of course, the correct condition for oscillation generation at any particular frequency.

As the line can be made to handle large amounts of power, it can be applied directly to a high power stage operating it as an oscillator, thereby allowing of the omission of former necessary apparatus, such as master oscillators of the piezo-electric or other types and a chain of frequency multipliers and amplifiers sufficient to bring the frequency multiplied energy up to a value sufficient to operate the power amplifier. Consequently, the use of such a line involves considerable saving in initial cost of equipment as well as operation maintenance and greatly simplifies the construction and operation of the equipment.

In the construction of an aperiodic long line frequency control system, however, difficulty has been experienced in making the line truly aperiodic. For practical reasons, for example, for economy of space, an artificial line, as generally used, is usually made in the form of an extended helix. As a result of certain characteristics of such a line, despite the fact that correct values of terminating surge impedances are used for the line, reflections and accompanying standing waves cannot be entirely eliminated without undue complications.

An object of the present invention is to avoid the difficulty of properly matching the impedance of the line and according to the present invention, the line terminating impedance should be as far from the matched condition as possible. That is, to utilize and increase standing wave effects, the terminating impedance of the line is either omitted or made of an incorrect value such that reflection occurs on the line. The standing wave on the line can be used together with the traveling wave on the line for controlling the frequency at which the electron discharge device or devices, to which the line is coupled, operates.

It is a further object of the present invention to utilize, together with such a "combination" line, that is, a line which utilizes for frequency stabilization, both a traveling and a standing wave, and the electron discharge device or devices associated with the line, means for preventing the effects of interelectrode feed back; such effects being evidenced for example, by the generation of parasitic oscillations at undesired frequencies. To prevent the effects of interelectrode feed back, according to this invention, either screen grid tubes or neutralized electron discharge devices are combined with the frequency controlling and stabilizing line. The broad combination of a neutralized electron discharge device and long line means for its frequency control is described and claimed more fully in our United States Patent No. 1,947,003, granted February 13, 1934.

From another aspect, the frequency stabilizing effect of the line may be said to be due to the fact that the voltage applied to the input circuit of the frequency controlled device shifts in phase with changes in frequency in undulatory electrical energy in the output circuit or at the input end of the line. In order to obtain a maximum shift in phase for small variations in frequency, it is desirable to couple the output circuit of the device to a voltage nodal or current maximum point in the input end of the line. Under such conditions the line will be a whole number of half wave lengths plus or minus one-quarter wave length long at the desired frequency and consequently this would involve a shift in phase of 90 degrees in potential away from the desired 180 degree phase difference in potential at the desired frequency between the anode and control electrode of the electron discharge device to which the line is coupled.

To remedy this defect is a further object of the present invention, and it is done by inserting in the line, a reactor, or similar device, preferably a capacitor or a quarter wave length of aperiodic line which will introduce a 90 degree phase shift.

Still a further object of the present invention is to apply the "combination" line in combination with a pushpull arranged electron discharge device for frequency stabilization thereof.

Although long line frequency control, because of the length of line necessary, is especially adapted for frequency control at the shorter wave lengths, a further object of this invention is to provide a system wherein long line frequency control may be applied to control longer wave length undulating electrical energy. To do so, a portion of long wave energy is changed into energy harmonically related in frequency. Long line frequency control may then be applied to the harmonic energy and the harmonically stabilized energy may be used to react upon the master long wave generator for frequency stabilization thereof.

Figure 2:
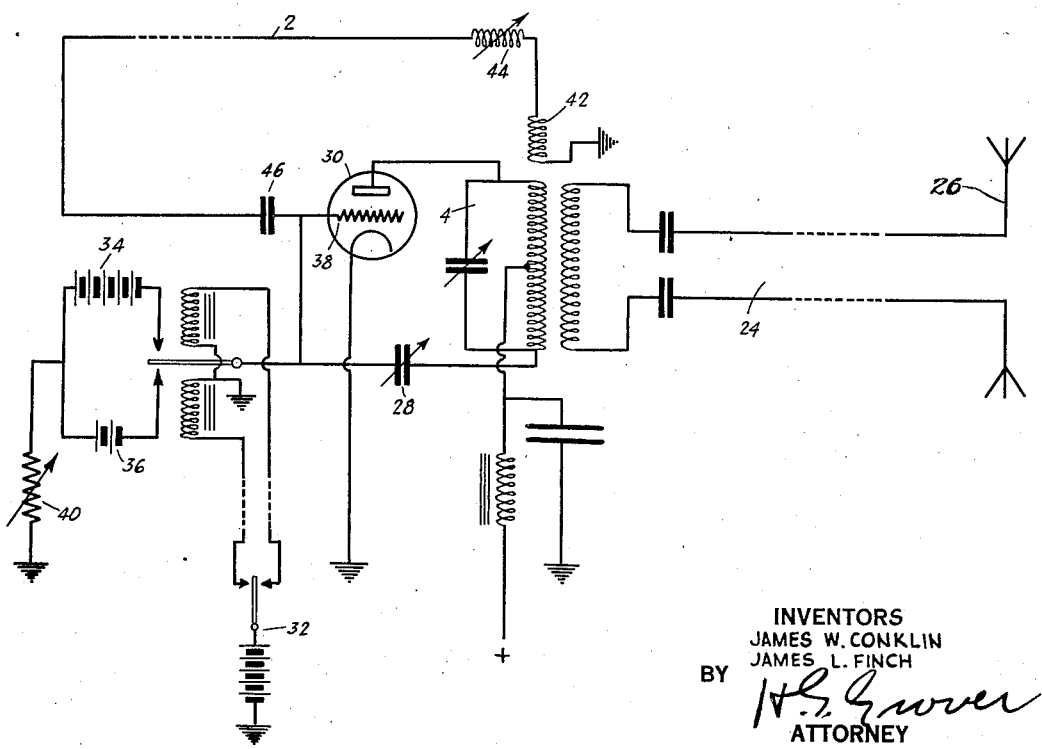
Figure 6:
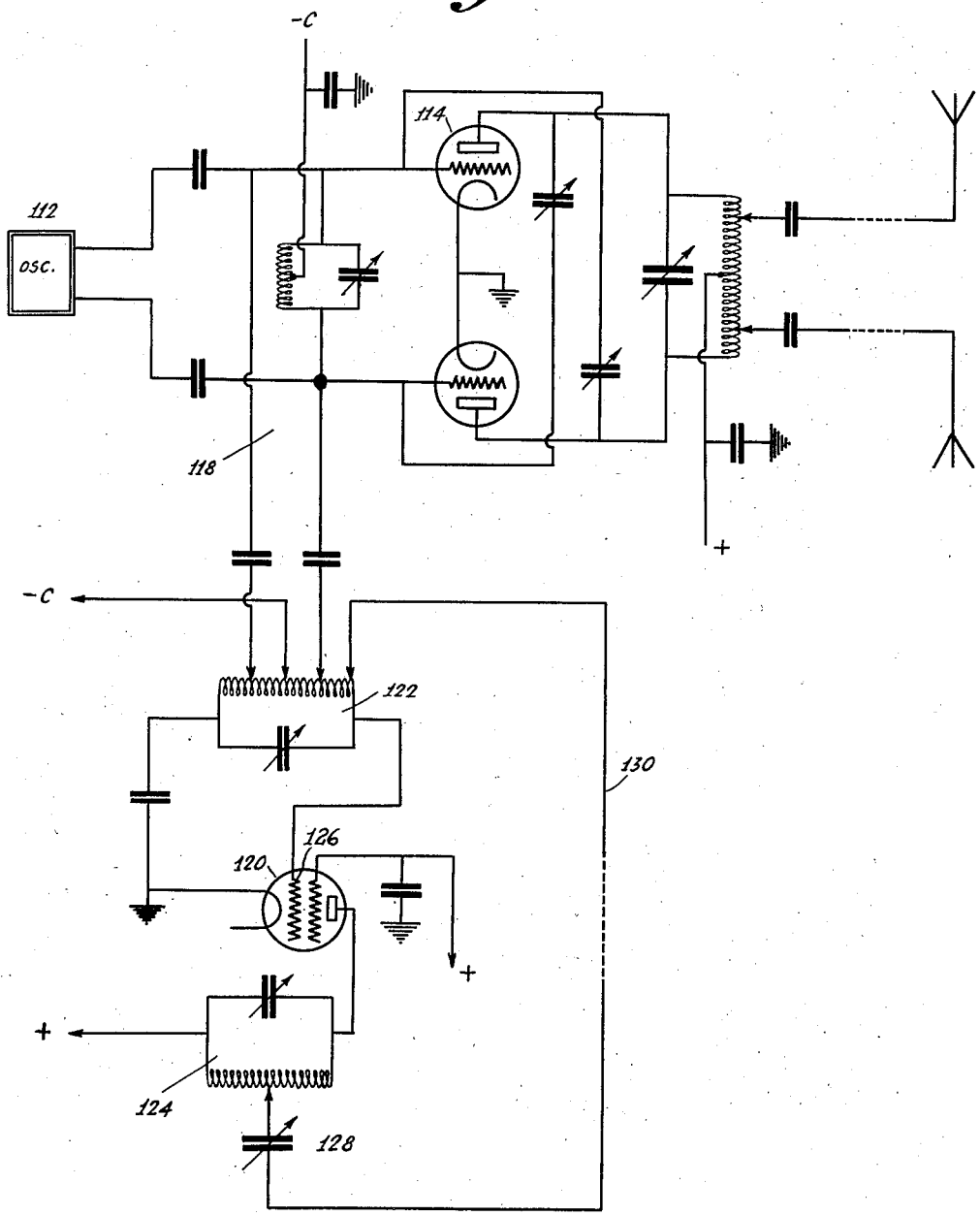

The present invention is more fully described in connection with the accompanying drawings, wherein Figure 1 illustrates a long line having traveling and standing waves thereon coupled to a screen grid type of electron discharge device oscillator for frequency stabilizing the oscillator, Figure 2 illustrates a similar system wherein the effects of interelectrode feed back are prevented by neutralization of the oscillator, the line, in this case, being inductively coupled at its input end to the output circuit of the device and utilizing an inductor rather than a capacitor for introducing a 90 degree phase shift in the energy fed over the line, Figure 3 illustrates a system, similar to that shown in Figure 2, wherein another type of neutralization is illustrated for the prevention of the effects of interelectrode feed back, Figure 4 illustrates among other things, the present invention applied to a pushpull type of oscillator, Figure 5 illustrates the application of long line frequency control to an ultra short wave length pushpull oscillator whose input circuits and output circuits consists of single looped conductors, and, Figure 6 illustrates a system wherein harmonic energy of an oscillator is frequency stabilized by long line means, the frequency stabilized harmonic energy reacting back upon the oscillator to stabilize and frequency control it at a fundamental frequency.

Referring to Figure 1, a long line 2 couples the output circuit 4 of electron discharge device 6 to the input circuit 8 thereof. As disclosed in the aforementioned United States Patent No. 1,945,545, by suitably terminating the line at its output end or at the input circuit of the device 6 by an impedance equal in value to the surge impedance of line 2, energy transfer over the line will be truly aperiodic; and, by making the line an odd number of half wave lengths long, where it couples the immediate input and output circuits of an electron discharge device, the line will cause potential fluctuations of the anode and control electrode of the device, 180 degrees out of phase for only energy of a frequency for which the line is an odd number of half wave lengths long. As other frequencies will be discriminated against, the system becomes very accurately frequency stabilized.

Frequency stabilization arises, not only due to the discriminating effect of the line, but mainly by virtue of the fact that the line causes a rapid phase shift, with a change in frequency, between the input and output circuits. This causes the electron discharge device or devices with which the line is associated, to supply energy to the output circuit tending to pull it back towards the correct frequency. The rapidity of this phase shift and consequently the frequency stabilizing effect, will be found to be proportional to the length of the line used.

To prevent interelectrode feed back, a screen grid such as screen grid 10 suitably biased by the action of a resistor 12, coupled to the anode lead 14 may be used; or, to prevent parasitic oscillations, an effect resulting from interelectrode feed back, the tube may be neutralized in a fashion such as illustrated in Figures 2 and 3. By the provision of either screen grids or neutralizing means, and by shielding the circuits to prevent intercircuit reaction, feed back, only along the line, is insured, thereby causing frequency control solely by action of the line resulting in excellent frequency stability, inasmuch as changes in frequency will be due, mainly, to changes in length of the line which, of course when in coiled form may be accurately temperature controlled, or, in either case may be made of a material having a negligible coefficient of thermal expansion.

For various reasons, however, true aperiodic transfer of energy over the line may not be feasible, as a result of which reflections are set up at the output end causing standing waves on the line. The standing waves, being of a wave length corresponding to the wave length for which the line is a number of half wave lengths long, may, in addition to the traveling wave over the line, be used for frequency control and stabilization.

To increase the standing wave effect, as illustrated in Figure 1, the usual terminating impedance for the line is omitted; and, the output end 16 of the line is so coupled to the input circuit that the impedance from point 16 to ground does not equal the surge impedance of the line. Such coupling will result as already indicated, in reflection along the line giving rise to standing waves. Point 16 of the line, should it be terminated by an impedance greater in value than the surge impedance of the line, will, for standing wave phenomenon, be always at a voltage maximum point shifting from a high positive value to a high negative value of undulating potential. In the event that the line terminating impedance is less than the surge impedance, point 16 will represent a current maximum point, and, therefore, under such circumstances the line should be tied near a voltage nodal point on the inductor of tank circuit 8.

With the circuit so far outlined, changes in frequency, arising from various causes, will not give the desired maximum variations in phase at the output end 16 of line 2. For optimum conditions of frequency control, and maximum changes in phase with changes in frequency, line 2, at its input end 18, should be coupled to the inductor of output circuit 4 at a voltage minimum or current maximum point. The line then represents a low impedance or current fed device and would be coupled near the center of the inductor included in tunable circuit 4.

Coupling line 2 at that point will, however, introduce an undesired 90 degree phase shift in potential transmitted over line 2 whose ends should wobble 180 degrees out of phase; and, to counteract that phase shift, a reactor 20 preferably in the form of a condenser is inserted in the line near its input end. Reactor 20 in this case is relatively small i. e. of high reactance, in order to introduce the desired 90 degree phase shift, and functions in addition to keep anode unidirectional potential from the control electrode of the device. Heretofore, of course, as disclosed in the copending application referred to, the condenser inserted at this point was relatively large, introducing no appreciable phase shift in energy fed to the line and acting solely to separate the direct potential on the plate from the grid of the frequency controlled device.

Modulation may, if desired, be accomplished by variation introducing modulating potentials into the anode supply lead through a transformer 22. As illustrated, the modulating potentials are not only applied to the plate, but they are simultaneously applied to the screen grid. The modulated output of the oscillator 6 may, of course, be then fed over suitable transmission line 24 to a suitable radiating antenna 26, preferably of the directive type.

Line 2 need not be capacitively connected or coupled to the output circuit 4, but may, as shown in Figure 2, be inductively coupled thereto by the action of secondary coil 42 which should have a relatively small number of turns such that large currents are introduced therein, introducing an effect equivalent to coupling the input end of the line to a low voltage point in the output circuit 4. Moreover, for the production of the 90 degree phase change, a reactor 44 in the form of a variable inductance coil may be provided. Condenser 46 preferably has a sufficiently large capacitance so that it does not introduce an appreciable phase change. In certain instances this condenser may be omitted. Its sole purpose is to prevent the accidental application of anode potential to the grid 38 should the secondary 42 by any chance contact with the anode circuit of tube 30.

Rather than prevent the effects of interelectrode feed back by the use of a screen grid tube such as shown in Figure 1, they may be prevented by a neutralization system such as illustrated in Figure 2 wherein the lower end of output circuit 4 is coupled through a neutralizing condenser 28 to the control electrode of oscillator 30. In this case anode potential should be supplied to the mid-point of the inductor forming part of the tunable output circuit 4.

In addition, the output circuit, namely, antenna 26 and its associated transmission line 24, may be inductively coupled rather than capacitively connected to the output circuit 4. Modulation may be accomplished, as illustrated, by variation of control electrode bias. By actuation of key 32, either source 34 or 36 is applied to the control electrode 38 of oscillator 30, the former causing blocking action or spacing intervals and the latter causing the production of oscillatory energy representative of marking intervals. The resistance 40 is inserted in the grid biasing circuits including sources of potential 34, 36, in order to prevent short circuiting of the sources should the grid lead become, by chance, grounded, and, of course, should be chosen of a value such that it does not correspond to the surge impedance of line 2.

The combination line may also be applied to an oscillator having the split input coil type of neutralization. Such a system is shown in Figure 3 wherein the split input coil 48 is connected through a neutralizing condenser 50 to the anode of electron discharge device 52. The frequency controlling line 2 is of the same type illustrated in connection with the apparatus shown in Figure 1 and is added, of course, after the tube 52 has been properly neutralized. In carrying out the present invention care should be taken that the impedance from point 16 to ground does not correspond to the surge impedance of the line 2.

Modulation may be accomplished by variation in grid biasing potential by the introduction of modulating potentials through the action of transformer 54.

Moreover, as illustrated in Figure 3, if desired, modulated output energy from oscillator 52 may be applied to a pushpull arrangement 56 of screen grid tubes acting as an amplifier for the modulated energy, the output of the amplifier 56 being suitably fed to a radiating antenna 58.

The application of the present invention utilizing the combination type of long line frequency control to a pushpull type of oscillator is illustrated in Figure 4. Electron discharge devices 60, 62 have separate, coiled frequency controlling lines 64, 66. In series with the lines, series capacitors 68, 70 are placed for producing the desired 90 degree phase shift, the input taps 72, 74 of the lines being coupled to output circuit 4 at substantially voltage nodes or current antinodes of the lines.

Care should be taken, of course, in the exercise of the present invention, that the impedance to ground from the output ends 76, 78 of the frequency controlling lines does not equal the surge impedance of the lines.

The tubes 60, 62 are preferably of the screen grid type having screen grids suitably grounded for high frequency potentials by the action of by-pass condensers 80, 82. The screen grids are biased by the action of resistance 84 coupling them to the anode supply lead in which there is also introduced, modulation potentials by the action of transformer 86.

Output energy may be directly radiated or, if desired, fed to a tuned pushpull amplifier 88 and thence radiated over a suitable radiating antenna 90.

Long line frequency control applied to a pushpull ultra short wave length oscillation generator is shown in Figure 5, wherein the output and input circuits 4, 8 of oscillators 60, 62 take the form of single looped inductors preferably in the form of metallic U-shaped trombone slides. Variation of the slides, of course, provides variations in tuning. The overall length of the input and output circuits will be found to be at desired frequencies substantially an odd number of half wave lengths long. Control electrode biasing potential may be introduced at a voltage nodal point 90, and anode polarizing potential together with modulation potential may be introduced at the voltage nodal point 92 of the output circuit 4.

As described in connection with the apparatus shown in Figure 4, the screen grids of tubes 60, 62 of Figure 5, are suitably grounded for radio frequency currents by means of suitable capacitors or condensers 80, 82.

For frequency control and stabilization, long lines 94, 96, are provided, each line having therein a trombone slide or U-shaped metallic slide 98 for varying the effective length of the line. Slides 98, of course, are similar in construction to the slides forming the input and output circuits. To provide for a 90 degree phase shift in energy fed over the lines to the input circuit, as already described, condensers 68, 70 are provided.

Output energy may be derived by coupling U-shaped loop 100 to the trough of the U-shaped conductor forming the output circuit 4, the overlapping loops being arranged so as to be spacially variable relative to each other such that the energy fed into amplifier 102, preferably of the screen grid type, may be varied. The amplified modulated high frequency energy may then be taken from the output circuit loop 104 of amplifier 102 through blocking condensers 106 over transmission line 108 to a suitable antenna 110 and radiated.

The long line systems described and referred to above have been applied directly to the generator of high frequency oscillations. It may be inconvenient to make a line sufficiently long for the control of oscillations of longer wave lengths, or, to have such a line occupy a sufficiently small space. In order to economize space by the use of a relatively small line for the control of the generation of long wave length oscillations, the system illustrated in Figure 6 may be used to good advantage. As shown, oscillations generated by a master oscillator 112 are fed to a neutralized amplifier 114 and thence radiated, after transmission through transmission lines, by a suitable antenna. As the waves generated by the oscillator 112 are relatively long in wave length, to apply long line frequency control directly thereto would involve the construction of an exceptionally long line in order to obtain therein a sufficient number of wave lengths of proper discriminatory characteristics.

To remedy this objection, a portion of the energy is taken from the output circuit of the oscillator 112 through lines 118 and fed to a harmonic producer 120 preferably of the screen grid type having an input circuit 122 tuned to the fundamental, and an output circuit 124 tuned to say, the third harmonic of the fundamental. The harmonic producer 120 has its control electrode 126 biased to a sufficiently high negative value such that only peak values of the applied input energy causes anode current flow. The harmonic producer and its action is described more fully in the United States Patent No. 1,878,308, granted September 20, 1932 to Clarence W. Hansell, and United States patent application, C. W. Hansell, Serial Number 525,419, filed March 26, 1931.

Long line frequency control such as described in the present case may then be applied to the harmonic producer and may comprise, as already indicated, a phase changing condenser 128 and a long line 130 a whole number of half wave lengths long at the desired harmonic frequency. The harmonic producer will then become stabilized at the harmonic frequency—a relatively high frequency to which long line frequency control is readily applicable. Consequently, due to the reaction of the harmonic producer on the oscillator through lines 118, the oscillator 112 will stay in step with a fundamental that will produce harmonics for which the line 130 has been made a whole number of half wave lengths long.

The system shown in Figure 6 is not limited to long line frequency control such as described, but to the harmonic producer 120 having aperiodic long line frequency control, such as described in the aforementioned Patent No. 1,945,545, or, resonant long line frequency control systems such as disclosed in the United States Patent No. 1,945,546, granted February 6, 1934, to Clarence W. Hansell.

In addition, it is to be clearly understood that the present invention is not limited to the modifications shown, and may be applied to many other systems as will readily suggest itself to those skilled in the art. For example, the "combination" line may be applied to the cascaded amplifier system such as illustrated in the aforementioned Patent No. 1,945,545, and, may be applied to modulating systems such as those disclosed by Clarence W. Hansell in his United States patent application, Serial Number 463,614, filed June 25, 1930, or, to the system disclosed in our aforementioned Patent No. 1,947,003. Attention is directed to the fact that the combination line is especially applicable to the frequency control and modulation systems described in said Patent No. 1,947,003, wherein modulating potentials are applied to the screen grids of a pair of pushpull arranged screen grid tubes, the output of the screen grid tubes being fed into a pushpull high frequency amplifier whose output circuit is coupled through long lines to the control electrodes of the screen grid, pushpull arranged, modulator tubes.

Having thus described our invention, what we claim is:

1. In electrical apparatus of the character described, an electron discharge device having input and output circuits and a long line, long relative to a desired operating wave length coupling together the input and output circuits of said device, said line being terminated at its output end as to have standing and traveling waves thereon, and acting to feed back energy from the output circuit to the input circuit of said device to cause it to selectively oscillate at a frequency dependent upon the length of said line, said line consisting of a conductor having uniformly distributed inductance and capacity and being electrically free of said cathode intermediate its ends.

2. In electrical apparatus of the character described, an electron discharge device having input and output circuits, a long line, long relative to a half wave length at the frequency at which said devices operate, coupling an alternating input circuit of said device and an alternating output circuit of said device, said line having uniformly distributed inductance and capacity and being free of lumped impedances intermediate its ends and being terminated at its output end by an impedance having an impedance value other than the surge impedance of said line such that standing waves are formed on the line.

3. In electrical apparatus of the character described, an electron discharge device having alternating input and output circuits, a long line, long relative to a half wave length at the frequency at which said device operates, coupling the output circuit to the input circuit, the output circuit of the device being coupled to a current maximum point in the line, the line having standing waves thereon, and, a reactance interposed in the line for introducing a 90 degree phase change in energy fed through the line from the output circuit of the device to the input circuit of the device.

4. In electrical apparatus of the character described, an electron discharge device having input and output circuits, a long line having uniformly distributed inductance and capacity and being free of lumped impedances intermediate its ends and coupling the circuits together for feeding energy from the output circuit of the device to the input circuit of the device, the line being terminated at its output end by an impedor having an impedance other than the surge impedance of the line, and, a capacitor connected to the input end of the line for introducing a predetermined phase displacement of the energy fed from the output circuit over the line to the input circuit of the device.

5. In undulatory electrical apparatus of the character described, an electron discharge device having input and output circuits, a long line a plurality of half wave lengths long at the working frequency of the device, coupled to the output circuit of the device at a current maximum point of the line and to the input circuit of the device for feeding back energy from the output circuit of the device to the input circuit of the device, a reactor in the line for introducing a predetermined phase change in the energy so fed back, impedance means, other in value than a surge impedance of the line, for improperly terminating the line at its output end such that standing waves at the working frequency are set up thereon, and means for preventing the effects of interelectrode feed back within the device.

6. In electrical apparatus of the character described, a plurality of electron discharge devices, cathodes of said devices being connected together, input and output circuits for said devices, and a long line for each device, coupling an output circuit of the device to an input circuit of the device, each of the lines being terminated with impedance means of a value other than a surge impedance of the respective lines at their output ends such that standing waves are set up on the line.

7. In electrical apparatus of the character described, a plurality of electron discharge devices, cathodes of said devices being connected together, input and output circuits for said devices, a long line for each device coupling an output circuit of the device to an input circuit of the device, each of the lines being terminated with impedance means at their output ends such that standing waves are set up on the line, and a reactor in each line for introducing a predetermined phase change in energy fed over each line from the output circuit of each device to an input circuit thereof.

8. In electrical apparatus of the character described, a plurality of electron discharge devices, cathodes of said devices being connected together, input and output circuits for said devices, a long line for each device, coupling an output circuit of the device to an input circuit of the device, each of the lines being terminated at their output ends with impedances of such value that standing waves are set up on the line, and, a condenser in each line for introducing a 90 degree phase change in energy fed back from the output circuit of each device to the input circuit of each device.

9. In electrical apparatus of the character described, a plurality of electron discharge devices, cathodes of said devices being connected together, input and output circuits for said devices, a long line, for each device, coupling an output circuit of the device to an input circuit of the device, each of the lines being terminated at their output ends with impedance means of such value that standing waves are set up on the line, a condenser in each line for introducing a 90 degree phase change in energy fed back from the output circuit of each device to the input circuit of each device, and means for reducing the effects of interelectrode feed back of each device.

10. In electrical apparatus of the character described, an electron discharge device having input and output circuits, a long line, long relative to a half wave length at the frequency at which said device operates, coupling an output circuit of the device to an input circuit of the device, the output circuit of the device being coupled to a current maximum point in the line, the line having standing waves thereon, a reactance interposed in the line for introducing a 90 degree phase change in energy fed through the line from the output circuit of the device to the input circuit of the device, and, a U-shaped metallic slide in the line for varying its length.

11. In electrical apparatus of the character described, a plurality of electron discharge devices, cathodes of said devices being connected together, input and output circuits for said devices, a long line for each device, coupling an output circuit of the device to an input circuit of the device, each of the lines being terminated at their output ends with impedance means of such value that standing waves are set up on the line, a condenser in each line for introducing a 90 degree phase change in energy fed back from the output circuit of each device to the input circuit of each device, and, a U-shaped metallic slide in each line for varying the length of each line.

12. In electrical apparatus of the character described, a plurality of electron discharge devices, cathodes of said devices being connected together, input and output circuits for said devices, a long line for each device coupling an output circuit of the device to an input circuit of the device, each of the lines being terminated at their output ends with impedance means of such value that standing waves are set up on the line, a condenser in each line for introducing a 90 degree phase change in energy fed back from the output circuit of each device to the input circuit of each device, means for preventing the effects of interelectrode feed back of each device, and, a U-shaped metallic slide in each line for varying the effective length of each line.

13. In electrical apparatus of the character described, a plurality of electron discharge devices having their cathodes connected together, input and output circuits for the devices, said circuits consisting of single looped conductors, a plurality of half wave lengths long at the frequency at which said devices operate, and, long lines coupled to electrodes of said devices, each of the lines being a plurality of half wave lengths long at the working frequency, for frequency stabilizing the frequency at which said devices operate.

14. In electrical apparatus of the character described, a plurality of electron discharge devices having their cathodes connected together, input and output circuits for the devices, said circuits consisting of single looped conductors a plurality of half wave lengths long at the frequency at which said devices operate, long lines coupled to electrodes of said devices, each of the lines being long relative to a half wave length at the working frequency for frequency stabilizing the frequency at which said devices operate, each of said lines coupling the input and output circuits, the lines being terminated at their output ends with impedance means of such value that standing waves are set up on the line, and, variable reactors in each line for introducing a predetermined phase change in energy fed back from the output circuit over the lines to the input circuit.

15. In electrical apparatus of the character described, an electron discharge device having input and output circuits, a long line coupling the circuits together for feeding energy from the output circuit of the device to the input circuit of the device, the line being terminated at its output end by an impedor having an impedance other than the surge impedance of the line, and, lumped impedance means connected to one end of the line for introducing a predetermined phase displacement of the energy fed from the output circuit over the line to the input circuit of the device, said line having uniformly distributed inductance and capacity and being electrically free of said cathode intermediate its ends.

16. In apparatus of the character described, an electron discharge device having an anode a cathode a control grid and a screen grid, an impedance connected between said anode and cathode, means for polarizing said screen grid to a suitable unidirectional potential, an impedance connected between said control grid and cathode, a long transmission line, long relative to a desired operating wave length, connected between said impedances, and, a variable reactance in series with said long transmission line, said line having uniformly distributed inductance and capacity and being free of lumped impedances intermediate its ends and being electrically free of said cathode intermediate its ends.

JAMES W. CONKLIN.
JAMES L. FINCH.